April 13, 1937.   G. V. LANCASTER   2,076,652
TRACTION TREAD CHAIN
Filed May 21, 1935
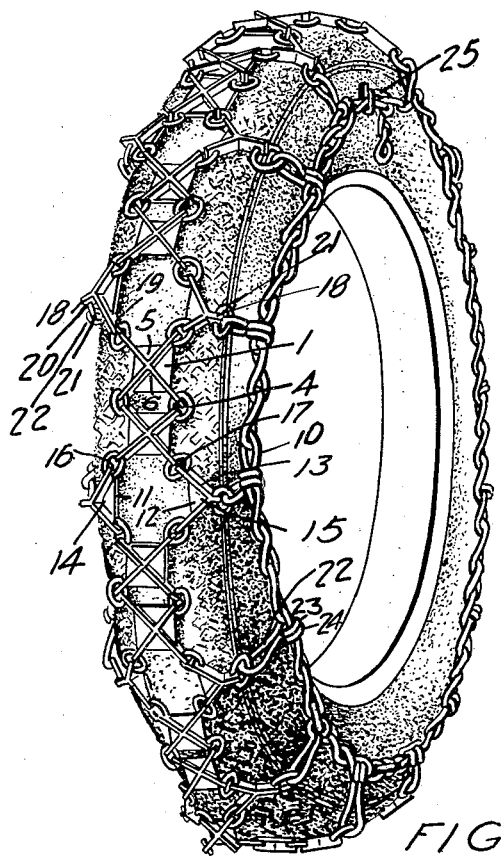
FIG.1.
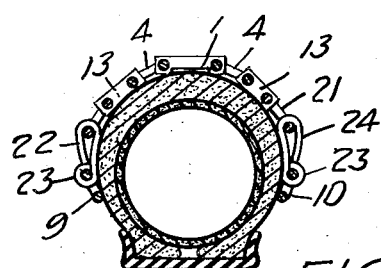
FIG.2.
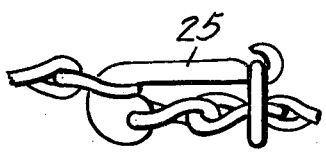
FIG.4.
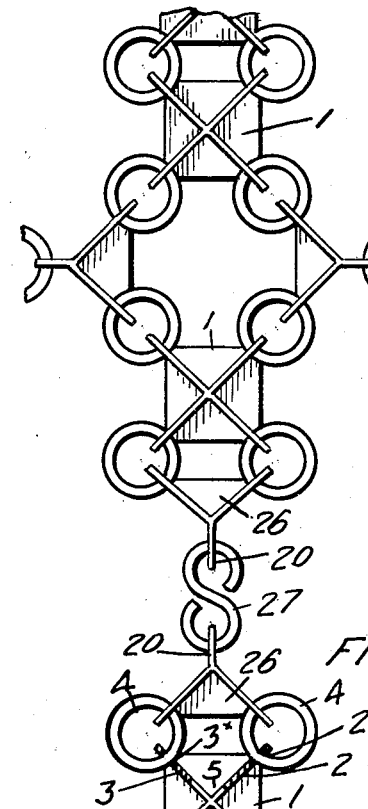
FIG.3.
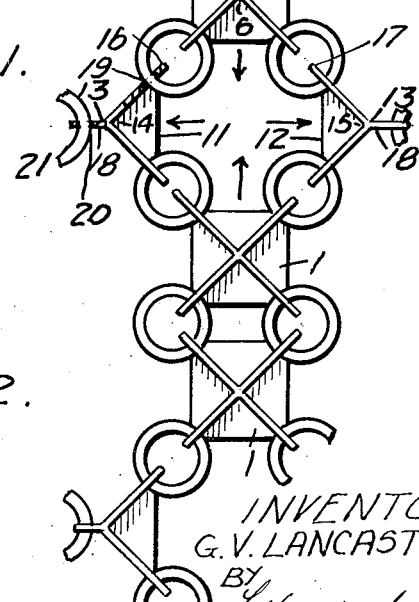
INVENTOR.
G. V. LANCASTER.
BY
ATTORNEYS.

UNITED STATES PATENT OFFICE 2,076,652

TRACTION TREAD CHAINS

George Victor Lancaster, Bobcaygeon, Ontario, Canada

Application May 21, 1935, Serial No. 22,600
In Canada January 3, 1935

1 Claim. (Cl. 152—14)

My invention relates to improvements in traction tread chains, and the object of the invention is to devise a chain which will have increased gripping power on the surface of the road and, therefore, provide increased traction, which will draw tight around the tread of the tire so as to cling thereto at all points and prevent the flapping of the chain due to looseness, which will prevent lateral movement of the tire on the road surface and, therefore, prevent skidding, which will be smooth running, evenly distribute the draw and which will be easily applied, and it consists essentially of the arrangement and construction of parts as hereinafter more particularly explained.

Fig. 1 is a perspective view of my traction tread chain applied to an automobile tire.

Fig. 2 is a cross sectional view through the chain and tire.

Fig. 3 is an enlarged plan detail view of the ends of the tread portion of the traction chain and the means for connecting such ends together.

Fig. 4 is a detail view showing one form of means for detachably locking the ends of the side chains together.

In the drawing like characters of reference indicate corresponding parts in each figure.

1 are rectangular tread plates forming the tread band and provided with diagonal criss-cross flanges or ribs 2 and 3 extending upward from the face of the plate and between the corners thereof and preferably extending beyond the corners of the plate to form lugs having orifices 2ˣ and 3ˣ formed therein through which rings 4 or any suitable form of link is passed to flexibly connect the plates 1 together. The plates 1 are preferably arranged in pairs spaced apart around the tire tread so that the flanges thereof form V recesses 5 and 6, the apices of the recesses being on the centre line of the tread, the open side of the V facing in opposite directions to increase traction in both directions and to counteract any tendency to forward or rearward skidding and V recesses 7 and 8, the open sides of which face laterally so as to prevent lateral skidding in either direction.

9 and 10 are the side chains which extend annularly around the tire at each side thereof according to the usual practice, the ends being detachably connected together by a locking mechanism such as indicated at 25 in Fig. 4 of any suitable form.

In order to connect the tread portion of the tire to the side chains 9 and 10, I interpose between each pair of rectangular tread plates 1 opposing triangular side plates 11 and 12 from which extend Y-shaped flanges or ribs 13 forming inwardly facing V recesses 14 and 15 which aid in traction and prevent lateral skidding in either direction and also form lugs 16 and 17 having perforations 19 through which rings 4 pass and lugs 18 having perforations 20 through which rings 21 pass.

22 are loops engaging the rings 21 and formed at their free ends into eyes 23 and 24 engaging the side chains 9 and 10 thereby connecting the tread portion of the traction chain to the side chains.

The ends of the tread band are provided with plates 26 similar to the plates 11 and 12 and engaging the end rings 4 of the end plates 1 so as to extend transversely of the tread with the lugs 20 thereof extending circumferentially. 27 is an S-hook extending through the perforations of the adjacent lugs 20 of the end plates 26.

When the chain is applied to the tire the fastening and tightening of the side chains 9 and 10 tend to draw the plates 11 and 12 laterally outward in the direction of arrow see Fig. 3 which in turn tend to draw the plates 1 to which the plates 11 and 12 are connected towards each other in the direction of arrow drawing the circumferential centre portion of the tread chain tight around the tire tread so that all slack is taken up and the flopping around of the slack eliminated and the draw of the chain on the road surface increased and equalized producing a smoother running of the vehicle and preventing the skidding of the wheels in any direction.

What I claim as my invention is:—

In a traction tread chain, the combination with the side chains and a device for drawing the ends of the side chains together, of a series of tread elements, each comprising a pair of spaced apart rectangular tread plates, diagonal flanges extending up from each plate, triangular plates located at each side of the aforesaid plates and centred opposite the centre of the intervening space and having their apices directed outwardly, flanges extending upwardly from the sides of the triangular plates and on a line with the flanges of the two adjacent rectangular plates to form with the flanges of such two adjacent plates a rectangular enclosure, and means for flexibly linking the rectangular to the triangular plates and the triangular plates to the side chains and for connecting the series of tread elements to each other.

GEORGE VICTOR LANCASTER.